US012474663B2

(12) United States Patent
Wada et al.

(10) Patent No.: US 12,474,663 B2
(45) Date of Patent: Nov. 18, 2025

(54) IMAGE FORMING APPARATUS

(71) Applicant: KYOCERA Document Solutions Inc., Osaka (JP)

(72) Inventors: Minoru Wada, Osaka (JP); Hiroshi Yamazaki, Osaka (JP); Asami Sasaki, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/970,192

(22) Filed: Dec. 5, 2024

(65) Prior Publication Data

US 2025/0199454 A1 Jun. 19, 2025

(30) Foreign Application Priority Data

Dec. 13, 2023 (JP) ................................. 2023-209924

(51) Int. Cl.
*G03G 5/082* (2006.01)
*G03G 15/00* (2006.01)
(Continued)

(52) U.S. Cl.
CPC ......... *G03G 15/80* (2013.01); *G03G 5/08214* (2013.01); *G03G 15/0812* (2013.01);
(Continued)

(58) Field of Classification Search
CPC ............. G03G 15/065; G03G 15/0266; G03G 15/0812; G03G 15/0907; G03G 15/09
See application file for complete search history.

(56) References Cited

U.S. PATENT DOCUMENTS

2019/0369521 A1 12/2019 Shimizu et al. ..... G03G 15/065
2020/0241436 A1* 7/2020 Watanabe .......... G03G 15/0266
(Continued)

FOREIGN PATENT DOCUMENTS

JP 2018-109719 A 7/2018
JP 2023-130007 A 9/2023

OTHER PUBLICATIONS

Extended European Search Report mailed Apr. 11, 2025, issued to European Application No. 24218495.0.

*Primary Examiner* — Jessica L Eley
(74) *Attorney, Agent, or Firm* — Stein IP, LLC

(57) ABSTRACT

An image forming apparatus includes an image carrying member, a charging device, an exposure device, a development device, and a development voltage power supply. The image carrying member has an amorphous silicon photosensitive layer formed on its surface. The development device includes a developer carrying member carrying two-component developer containing toner and carrier. The development voltage power supply applies to the developer carrying member a development voltage having an alternating-current voltage superposed on a direct-current voltage. When the blank part potential on the image carrying member is V0 [V], the direct-current voltage is Vdc [V], the peak-to-peak value of the alternating-current voltage Vac is Vpp [kV], and the gap between the image carrying member and the developer carrying member is Ds [mm], $10 \leq V0-Vdc \leq 90$ and $1.2 \leq Vpp/Ds \leq 3.5$ are fulfilled.

8 Claims, 4 Drawing Sheets

(51) Int. Cl.
*G03G 15/08* (2006.01)
*G03G 15/09* (2006.01)
*G03G 15/16* (2006.01)

(52) U.S. Cl.
CPC ....... *G03G 15/0921* (2013.01); *G03G 15/162* (2013.01); *G03G 2215/0609* (2013.01)

(56) References Cited

U.S. PATENT DOCUMENTS

2021/0302859 A1* 9/2021 Tanaka ............... G03G 15/0266
2021/0302870 A1* 9/2021 Tanaka ................. G03G 15/065

* cited by examiner

IMAGE FORMING APPARATUS

INCORPORATION BY REFERENCE

This application is based on and claims the benefit of priority from Japanese Patent Application No. 2023-209924 filed on Dec. 13, 2023, the contents of which are hereby incorporated by reference.

BACKGROUND

The present disclosure relates to an image forming apparatus including an image carrying member, such as a copier, a printer, a facsimile machine, a multifunction peripheral with the functions of all of them, and the like, and especially relates to an image forming apparatus of a two-component development type and using an amorphous silicon photosensitive member as an image carrying member.

In an image forming apparatus, an electrostatic latent image formed on an image carrying member formed of a photosensitive member or the like is developed by a development device to be visualized as a toner image. Some such development devices employ a two-component development system using two-component developer.

For an image forming apparatus with a high process linear velocity, employing the two-component development system tends to encounter the problem of carrier movement from the development device to a photosensitive drum (i.e., carrier development). Carrier development is liable to occur especially when an amorphous silicon (a-Si) photosensitive member is used, which has a high dielectric constant and to which carrier exhibits strong adhesion.

SUMMARY

According to one aspect of the present disclosure, an image forming apparatus includes an image carrying member, a charging device, an exposure device, a development device, and a development voltage power supply. The image carrying member has an amorphous silicon photosensitive layer formed on its surface. The charging device electrostatically charges the surface of the image carrying member. The exposure device exposes the surface of the image carrying member electrostatically charged by the charging device to light to form an electrostatic latent image with reduced electrostatic charge. The development device includes a developer carrying member that carries two-component developer containing toner and carrier, and supplies the image carrying member with the toner in the developer carried on the developer carrying member to develop the electrostatic latent image into a toner image. The development voltage power supply applies to the developer carrying member a development voltage resulting from superposing an alternating-current voltage Vac on a direct-current voltage Vdc. When the blank part potential on the image carrying member is V0 [V], the peak-to-peak value of the alternating-current voltage Vac is Vpp [kV], and the gap between the image carrying member and the developer carrying member is Ds [mm], then formulae (1) and (2) below are fulfilled:

$$10 \leq V0 - Vdc \leq 90 \tag{1}$$

$$1.2 \leq Vpp/Ds \leq 3.5 \tag{2}$$

DETAILED DESCRIPTION

Figure 1:
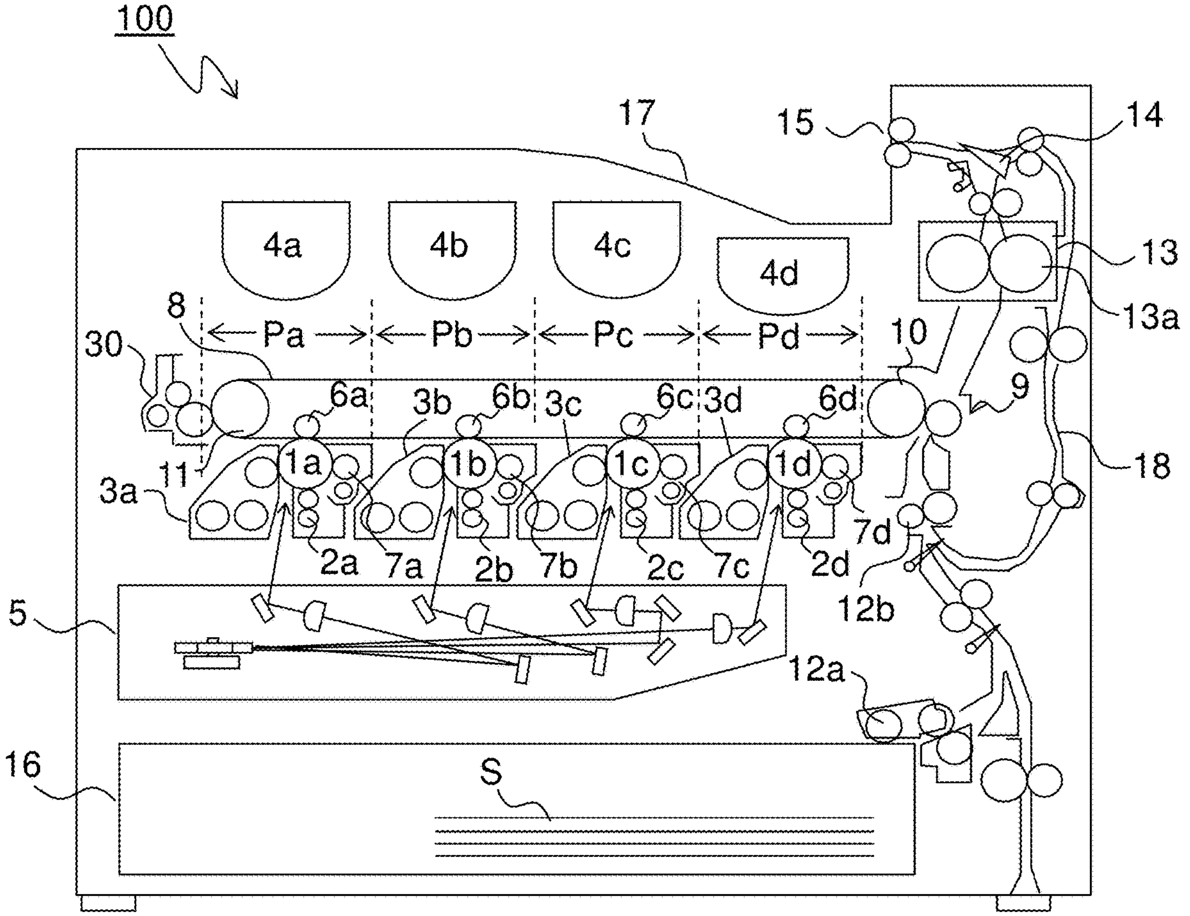
FIG. 1 is a schematic sectional view of a color printer according to an embodiment of the present disclosure.
Figure 2:
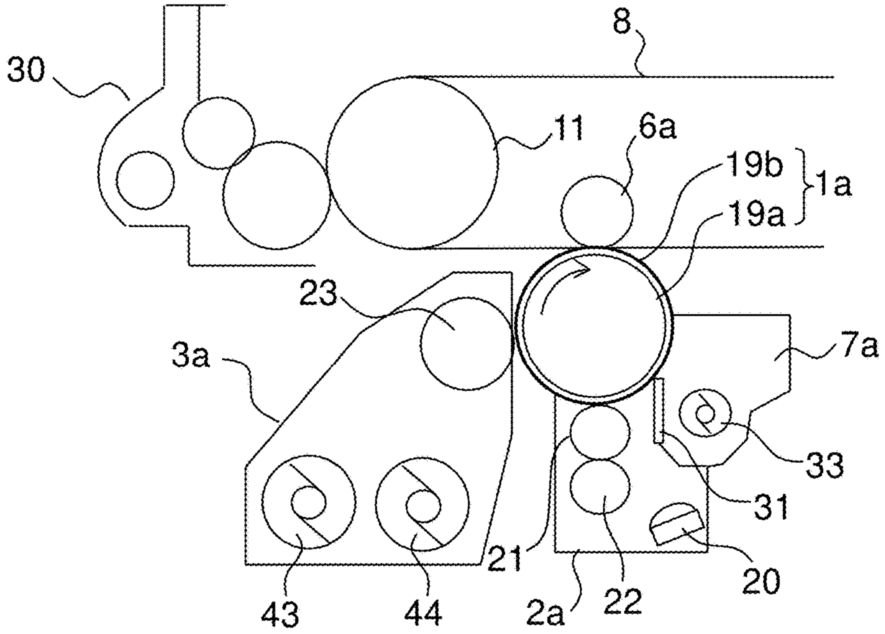
FIG. 2 is an enlarged view around an image forming section in FIG. 1.

An embodiment of the present disclosure will be described below with reference to the accompanying drawings. FIG. 1 is a schematic sectional view showing a color printer 100 according to one embodiment of the present disclosure. FIG. 2 is an enlarged view around an image forming section Pa in FIG. 1. Note that no description will be given of image forming sections Pb to Pd since these basically have similar configurations.

Inside the body of color printer 100, four image forming sections Pa, Pb, Pc, and Pd are provided in this order from upstream (left side in FIG. 1) in the conveyance direction. These image forming sections Pa to Pd are provided so as to correspond to images of four different colors (yellow, magenta, cyan, and black) and sequentially form a yellow, a magenta, a cyan, and a black image, respectively, each through the processes of electrostatic charging, exposure to light, image development, and image transfer.

These image forming sections Pa to Pd include photosensitive drums 1*a*, 1*b*, 1*c*, and 1*d* that carry visible images (toner images) of the different colors. An intermediate transfer belt 8 that rotates counter-clockwise in FIG. 1 is provided adjacent to the image forming sections Pa to Pd. The intermediate transfer belt 8 is wound around a driving roller 10, at the downstream side, and a tension roller 11, at the upstream side. Upstream of the image forming section Pa with respect to the rotation direction of the intermediate transfer belt 8, a belt cleaning device 30 is arranged opposite the tension roller 11 across the intermediate transfer belt 8.

As shown in FIG. 2, around the photosensitive drum 1*a*, along the drum rotation direction (clockwise in FIG. 2), a charging device 2*a*, a development device 3*a*, a cleaning device 7*a*, and a static elimination device 20 are provided, and a primary transfer roller 6*a* is arranged across the intermediate transfer belt 8.

The photosensitive drums 1*a* to 1*d* include a conductive base 19*a* and a photosensitive layer 19*b* formed on the surface of the conductive base 19*a*. In this embodiment, an amorphous silicon photosensitive drum is used that has, as the photosensitive layer 19*b*, an amorphous silicon (a-Si) photosensitive layer deposited on the surface of a cylindrical conductive base 19*a* made of aluminum.

The charging devices 2*a* to 2*d* include a charging roller 21 that makes contact with the photosensitive drums 1*a* to 1*d* to apply a charging voltage (direct-current voltage+alternating-current voltage) to the drum surface, and a charging cleaning roller 22 for cleaning the charging roller 21.

The development devices 3*a* to 3*d* include a developing roller 23, a stirring conveyance screw 43, and a feeding conveyance screw 44. The development devices 3*a* to 3*d* are of a two-component development type and are loaded with predetermined amounts of two-component developer containing yellow, magenta, cyan, and black toner, respectively, mixed with magnetic carrier. Using the two-component developer, a magnetic brush is formed on the surface of the developing roller 23, and the magnetic brush is brought into contact with the surface of the photosensitive drum 1*a* to attach the toner to it with a development voltage of the same polarity as the toner (here, positive polarity) applied to the developing roller 23; thus, a toner image is formed. When the proportion of the toner in the two-component developer in the development devices 3*a* to 3*d* falls below a prescribed value with the formation of the toner image, toner is supplied to the development devices 3*a* to 3*d* from toner containers 4*a* to 4*d*.

The cleaning devices 7*a* to 7*d* include a cleaning blade 31 and a collection screw 33. The cleaning blade 31 removes residual toner and the like on the surface of the photosensitive drums 1*a* to 1*d*. The collection screw 33 discharges the toner and the like removed by the cleaning blade 31 out of the cleaning devices 7*a* to 7*d* and collects them in a waste toner collection container (not shown). The static elimination device 20 shines static elimination light to the surface of the photosensitive drums 1*a* to 1*d* to eliminate residual charge.

Figure 4:
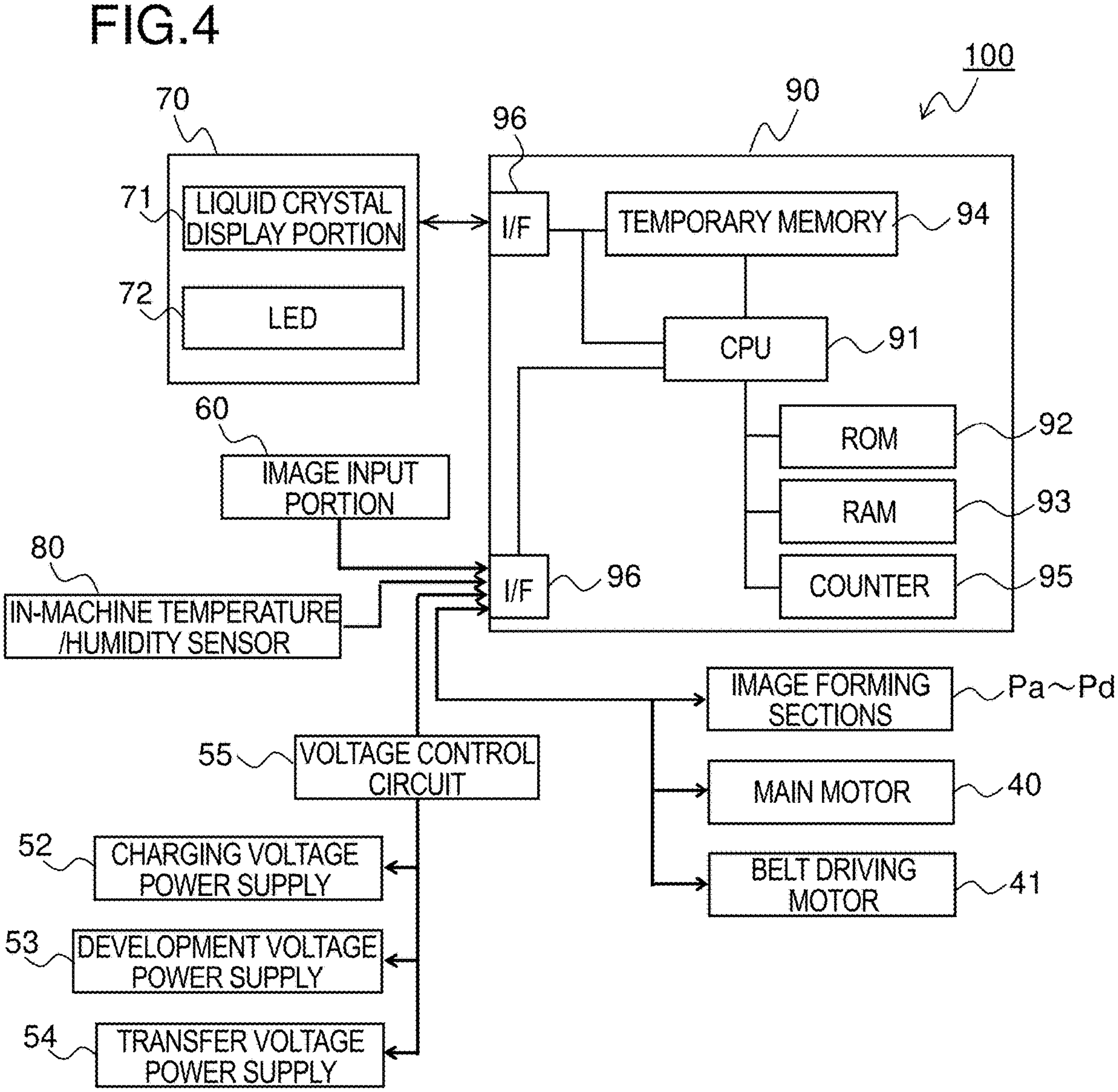
FIG. 4 is a block diagram showing an example of control paths used in the color printer.

When image data is input from a host device such as a computer, first, the rotation of the photosensitive drums 1*a* to 1*d* is started by a main motor 40 (see FIG. 4). The rotational driving of the intermediate transfer belt 8 is also started by a belt driving motor 41 (see FIG. 4). The charging devices 2*a* to 2*d* then electrostatically charge the surfaces of the photosensitive drums 1*a* to 1*d* uniformly with the same polarity as the toner (here, positive polarity). Next the exposure device 5 shines light corresponding to the image data to form, on the photosensitive drums 1*a* to 1*d*, electrostatic latent images with electrostatic charge reduced according to the image data.

The development devices 3*a* to 3*d* are loaded with predetermined amounts of two-component developer (hereinafter also referred to simply as developer) containing yellow, magenta, cyan, and black toner supplied from the toner containers 4*a* to 4*d*, and the toner in the developer is fed onto the photosensitive drums 1*a* to 1*d* by the development devices 3*a* to 3*d* to electrostatically attach to them. Thereby toner images are formed according to the electrostatic latent images formed by exposure to the light from the exposure device 5.

With a predetermined transfer voltage, an electric field is produced by the primary transfer rollers 6*a* to 6*d* between the primary transfer rollers 6*a* to 6*d* and the photosensitive drums 1*a* to 1*d*, and the yellow, magenta, cyan, and black toner images on the photosensitive drums 1*a* to 1*d* are primarily transferred to the intermediate transfer belt 8. The cleaning devices 7*a* to 7*d* remove residual toners and the like on the surface of the photosensitive drums 1*a* to 1*d* after primary transfer. The static elimination device 20 eliminates the residual charge on the surface of the photosensitive drums 1*a* to 1*d* after primary transfer.

A transfer sheet P, to which the toner images are transferred is stored in a sheet cassette 16 arranged in a lower part inside the color printer 100. The transfer sheet P is conveyed via a sheet feed roller 12*a* and a pair of resist rollers 12*b* with predetermined timing to the nip (secondary transfer nip) between a secondary transfer roller 9, provided adjacent to the intermediate transfer belt 8, and the intermediate transfer belt 8. The transfer sheet P having the toner images secondarily transferred to it is conveyed to a fixing section 13.

The transfer sheet P conveyed to the fixing section 13 is heated and pressed by a pair of fixing rollers 13*a* so that the toner images are fixed to the surface of the transfer sheet P to form a predetermined full-color image. The transfer sheet P having the full-color image formed on it is discharged to a discharge tray 17 by a pair of discharge rollers 15 as it is (or after being distributed to a reversing conveyance passage 18 by a branch portion 14 to have images formed on both sides).

Figure 3:
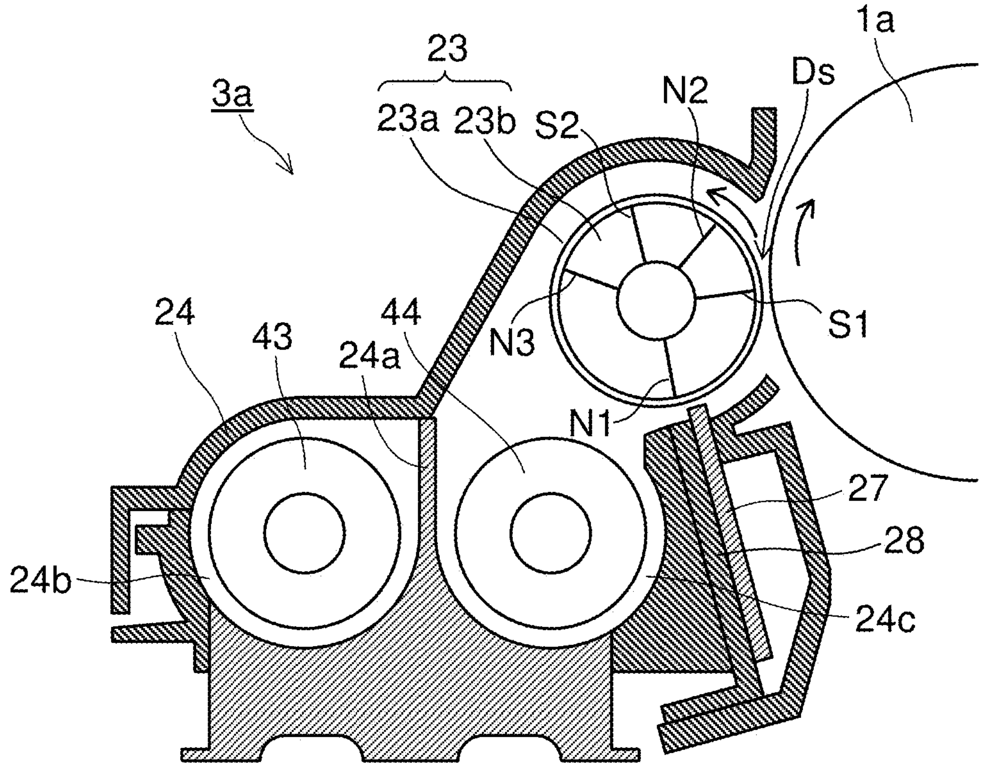
FIG. 3 is a side sectional view showing a configuration of a development device.

FIG. 3 is a side sectional view showing the configuration of the development device 3*a* mounted in the color printer 100. FIG. 3 illustrates the configuration and operation of the development device 3*a* corresponding to the photosensitive drum 1*a* in FIG. 1; for the configuration and operation of the development devices 3*b* to 3*d*, which are similar to the development device 3*a*, no description will be given.

As shown in FIG. 3, the development device 3*a* includes a development container 24 that stores two-component developer (hereinafter also referred to simply as developer) containing magnetic carrier and toner. The development container 24 is divided into a stirring conveyance chamber 24*b* and a feeding conveyance chamber 24*c* with a compartment wall 24*a*. In the stirring conveyance chamber 24*b* and the feeding conveyance chamber 24*c*, there are respectively disposed, both rotatably, a stirring conveyance screw 43 and a feeding conveyance screw 44, which are for mixing and stirring the toner supplied from the toner container 4*a* (see FIG. 1) with the magnetic carrier to electrostatically charge them.

The stirring conveyance screw 43 and the feeding conveyance screw 44 stir and convey the developer in the axial direction (the direction perpendicular to the plane of FIG. 3) and the developer circulates between the stirring conveyance chamber 24*b* and the feeding conveyance chamber 24*c* via communicating portions (not shown) formed in opposite end parts of the compartment wall 24*a*. That is, the stirring conveyance chamber 24*b*, the feeding conveyance chamber 24*c*, and the communicating portions constitute a circulation passage for developer in the development container 24.

The development container 24 extends obliquely to the upper right in FIG. 3, and the developing roller 23 is arranged in the development container 24 obliquely to the upper right of the feeding conveyance screw 44. A part of the outer circumferential surface of the developing roller 23 is exposed through an opening in the development container 24 and faces the photosensitive drum 1*a* across a predetermined gap (development gap Ds) to form a development area. The developing roller 23 rotates counter-clockwise in FIG. 3 (rotates by trailing at a position opposite the photosensitive drum 1*a*).

The developing roller 23 is composed of a development sleeve 23*a* and a magnet 23*b*. The development sleeve 23*a* is cylindrical and rotates counter-clockwise in FIG. 3. The development sleeve 23*a* can be of any type such as one with a knurled surface, one with a large number of depressions (dimples) formed in the surface, one with a blasted surface, or one knurled, having depressions formed and in addition blasted or plated.

The magnet 23*b* is fixed in the development sleeve 23*a* so as not to be rotatable. The magnet 23*b* is configured to have five poles: a main pole S1 arranged in an area (developing area) opposite the photosensitive drum 1*a*, a regulation pole (attracting pole) N1 arranged in an area (regulation portion) opposite a regulation blade 27, conveyance poles S2 and N2, and a release pole N3. When a driving force is fed to the development device 3*a*, the development sleeve 23*a* rotates but the magnet 23*b* does not. A development voltage power supply 53 (see FIG. 4) applies a development voltage containing a direct-current voltage Vdc and an alternating-current voltage Vac to the developing roller 23.

The regulation blade 27 is attached to the development container 24. More specifically, the regulation blade 27 is attached along the longitudinal direction of the developing roller 23 (the direction perpendicular to the plane of FIG. 3) via a blade support plate 28. A slight gap (regulation gap) is provided between the tip of the regulation blade 27 and the outer circumferential surface of the developing roller 23 to form the regulation portion. In this embodiment, a magnetic blade made of stainless steel (SUS430) is used as the regulation blade 27.

Between the regulation pole N1 in the magnet 23*b* and the regulation blade 27, a magnetic field is produced in the attracting direction, and thus particles of the developer chain between the regulation blade 27 and the developing roller 23 to form a magnetic brush. As the magnetic brush passes across the regulation blade 27 (regulation portion), its layer thickness is regulated to a predetermined height. After that, as the development sleeve 23*a* rotates counter-clockwise, the magnetic brush moves to the development area. The main pole S1 then produces a magnetic field in the attracting direction between the main pole S1 and the photosensitive drum 1*a*, and the magnetic brush makes contact with the surface of the photosensitive drum 1*a* to develop the electrostatic latent image.

As the development sleeve 23*a* further rotates counter-clockwise, the conveyance poles N2 and S2 produce a magnetic field in a direction along the outer circumferential surface of the development sleeve 23*a* so that, together with the magnetic brush, the developer left unused in formation of the toner image is collected on the development sleeve 23*a*. At the release pole N3, with the opposite polarity to the conveyance pole S2, the magnetic brush then separates from the developing roller 23 and falls into the feeding conveyance chamber 24*c*. After the developer is stirred and conveyed by the feeding conveyance screw 44, a magnetic brush is formed again on the development sleeve 23*a* with the magnetic field produced by the regulation pole N1.

FIG. 4 is a block diagram showing an example of control paths used in the color printer 100. Note that since various kinds of control are performed in different parts of the color printer 100 when it is in use and the control paths in the whole color printer 100 are complicated, the following description will focus on those of the control paths which are necessary in implementing the present disclosure.

A charging voltage power supply 52 applies a charging voltage to the charging roller 21 in the charging devices 2*a* to 2*d*. The development voltage power supply 53 applies a development voltage having an alternating-current voltage Vac superposed on a direct current voltage Vdc to the developing roller 23 in the development devices 3*a* to 3*d*. A transfer voltage power supply 54 applies a predetermined primary transfer voltage and a predetermined secondary transfer voltage to the primary transfer rollers 6*a* to 6*d* and the secondary transfer roller 9, respectively. A voltage control circuit 55 is connected to the charging voltage power supply 52, the development voltage power supply 53, and the transfer voltage power supply 54, and operates these power supplies according to an output signal from a control portion 90.

An image input portion 60 is a receiving portion that receives image data transmitted from a personal computer or the like to the color printer 100. An image signal fed from the image input portion 60 is converted into a digital signal, and is then fed out to a temporary memory 94.

An operation portion 70 includes a liquid crystal display portion 71 and LEDs 72. The liquid crystal display portion 71 displays the operating status of the color printer 100, the state of image formation, the number of copies printed, and the like. The LEDs 72 indicate various states, errors, and the like on the color printer 100. Various settings for the color printer 100 are made from a printer driver on the personal computer.

The operation portion 70 also has a start button with which a user can give an instruction to start image formation, a stop/clear button used to cancel image formation, a reset button used to get various settings of the color printer 100 back to the default ones, and the like.

An in-machine temperature/humidity sensor 80 detects the temperature and humidity inside the color printer 100, especially the temperature and humidity around the image forming sections Pa to Pd, and is arranged near the image forming sections Pa to Pd.

The control portion 90 at least includes a CPU (central processing unit) 91 as a central arithmetic processor, a ROM (read-only memory) 92 as a memory for reading only, a RAM (random-access memory) 93 as a readable and writable memory, a temporary memory 94 for storing image data and the like temporarily, a counter 95, and a plurality of (here, two) I/Fs (interfaces) 96 for transmitting control signals to different devices in the color printer 100 and receiving input signals from an operation portion 70. The control portion 90 can be disposed anywhere in the body of the color printer 100.

The ROM 92 stores data and the like that are not changed during use of the color printer 100, such as programs for controlling the color printer 100, and numerical values necessary for control. The RAM 93 stores necessary data produced during control of the color printer 100, data that is temporarily necessary in controlling the color printer 100, and the like. The temporary memory 94 temporarily stores an image signal fed from the image input portion 60 and converted into a digital signal. The counter 95 counts the number of sheets printed on a cumulative basis.

The control portion 90 transmits control signals from the CPU 91 to different portions and devices in the color printer 100 through the I/Fs 96. In return, different portions and devices transmit signals indicating their states and input signals to the CPU 91 through the I/Fs 96. Examples of the different portions and devices controlled by the control portion 90 include the image forming sections Pa to Pd, the exposure device 5, the intermediate transfer belt 8, the secondary transfer roller 9, the fixing section 13, the voltage control circuit 55, the image input portion 60, the operation portion 70, the in-machine temperature/humidity sensor 80, and the like.

The color printer 100 of a two-component development type of the embodiment suppresses an image defect by setting the development conditions properly when amorphous silicon photosensitive drums are used as the photosensitive drums 1*a* to 1*d*. Now, a detailed description will be given of the settings of a blank part (background part) potential V0 on the photosensitive drums 1*a* to 1*d*, the development voltage (direct-current voltage Vdc and alternating-current voltage Vac), and the gap (development gap) Ds between the photosensitive drums 1*a* to 1*d* and the developing roller 23.

In this embodiment, the potential difference (development potential difference) V0–Vdc [V] between the blank part potential V0 [V] and the direct-current voltage Vdc [V] in the development voltage is set so as to fulfill formula (1) below:

$$10 \leq V0 - Vdc \leq 90 \quad (1)$$

The peak-to-peak value Vpp [kV] of the alternating-current voltage Vac in the development voltage and the development gap Ds [mm] are set so as to fulfill formula (2) below. The conditions of formulae (1) and (2) are set in a considerably low region as compared with the development conditions for the common two-component development type.

$$1.2 \leq Vpp/Ds \leq 3.5 \quad (2)$$

Figure 5:
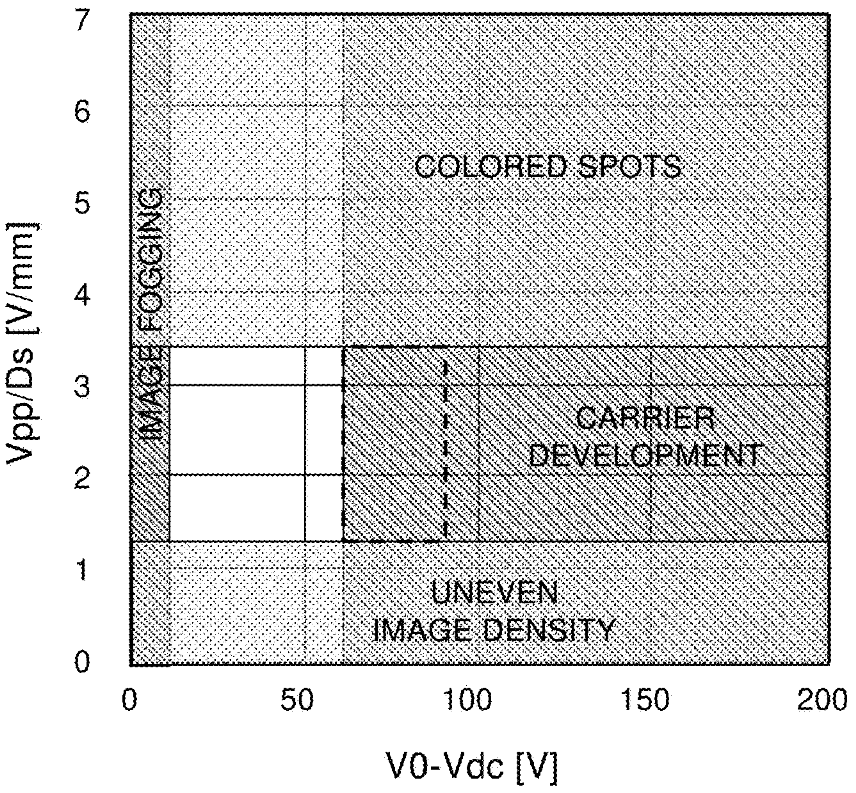
FIG. 5 is a diagram showing image defects observed as V0−Vdc and Vpp/Ds are changed.

FIG. 5 is a diagram showing the image defects observed as V0–Vdc and Vpp/Ds are changed. As shown in FIG. 5, image fogging occurs in the region where V0–Vdc is lower than 10 [V] (slant-hatched region at left in FIG. 5) because V0–Vdc is too low. On the other hand, visible carrier development occurs in the region where V0–Vdc is higher than 90 [V] (slant-hatched region at right in FIG. 5) because V0–Vdc is too high.

Uneven image density occurs in the region where Vpp/Ds is lower than 1.2 (dot-hatched region at bottom in FIG. 5). On the other hand, colored spots caused by a leakage between the photosensitive drums 1*a* to 1*d* and the developing roller 23 occur in the region where Vpp/Ds is higher than 3.5 (dot-hatched region at top in FIG. 5).

Based on the forgoing, setting V0–Vdc and Vpp/Ds within the development conditions that fulfill formulae (1) and (2) (blank area in FIG. 5) permits carrier development and leakage-induced colored spots, which are liable to occur when amorphous silicon photosensitive members are used, to be suppressed so low that they do not affect the image quality. It is also possible to suppress image fogging and uneven image density.

In the region where V0–Vdc is from 60 to 90 [V] (region surrounded by broken lines in FIG. 5), carrier development is observed but is not visible and is hence practically tolerable. Thus, setting the development potential difference V0–Vdc [V] so as to fulfill formula (3) below helps obtain higher image quality.

$$10 \leq V0 - Vdc \leq 60 \quad (3)$$

Next, the setting of the frequency f of the alternating-current voltage Vac in the development voltage will be described. Table 1 shows the relationship of the frequency f with image fogging and uneven image density. In Table 1, "GOOD" denotes absence of image fogging and uneven image density, "FAIR" denotes presence of invisible and hence practically tolerable image fogging and uneven image density, and "POOR" denotes presence of notable and thus practically intolerable image fogging and uneven image density.

TABLE 1

| | Frequency [kHz] | | | | | | | |
|---|---|---|---|---|---|---|---|---|
| | 9 | 10 | 11 | 12 | 13 | 14 | 15 | 16 |
| Image fogging | POOR | FAIR | FAIR | GOOD | GOOD | GOOD | GOOD | GOOD |
| Uneven image density | GOOD | GOOD | GOOD | GOOD | GOOD | GOOD | GOOD | POOR |

As shown in Table 1, image fogging occurred at frequencies f lower than 10 [kHz]. On the other hand, uneven image density occurred at frequencies f higher than 15 [kHz]. The frequency f [kHz] is therefore set so as to fulfill formula (4) below. Doing so helps suppress uneven image density while suppressing the level of image fogging, which is liable to occur when V0–Vdc and Vpp/Ds are set so as to fulfill formulae (1) and (2).

$$10 \leq f \leq 15 \quad (4)$$

In the range of frequencies f from 10 to 12 [kHz], image fogging occurred but was not visible and was hence practically tolerable. Setting frequency f [kHz] so as to fulfill formula (5) helps obtain higher image quality.

$$12 \leq f \leq 15 \quad (5)$$

Setting the blank part potential V0 [V] on the photosensitive drums 1*a* to 1*d* so as to fulfill formula (6) below helps suppress variations in the surface potential on the photosensitive drums 1*a* to 1*d*. This makes it possible to control V0–Vdc within a limited range that fulfills formulae (1) and (3).

$$100 \leq V0 \leq 250 \quad (6)$$

In the embodiment, the regulation pole N1 in the developing roller 23 is configured to have a half-value width (the angle across which the magnetic force is equal to or more than one-half of the peak value) of 50° or more, the regulation blade 27 and the blade support plate 28 are formed of a magnetic member, and the regulation blade 27 is fitted so as to protrude toward the developing roller 23 beyond the blade support plate 28, forming a step from it.

Figure 6:
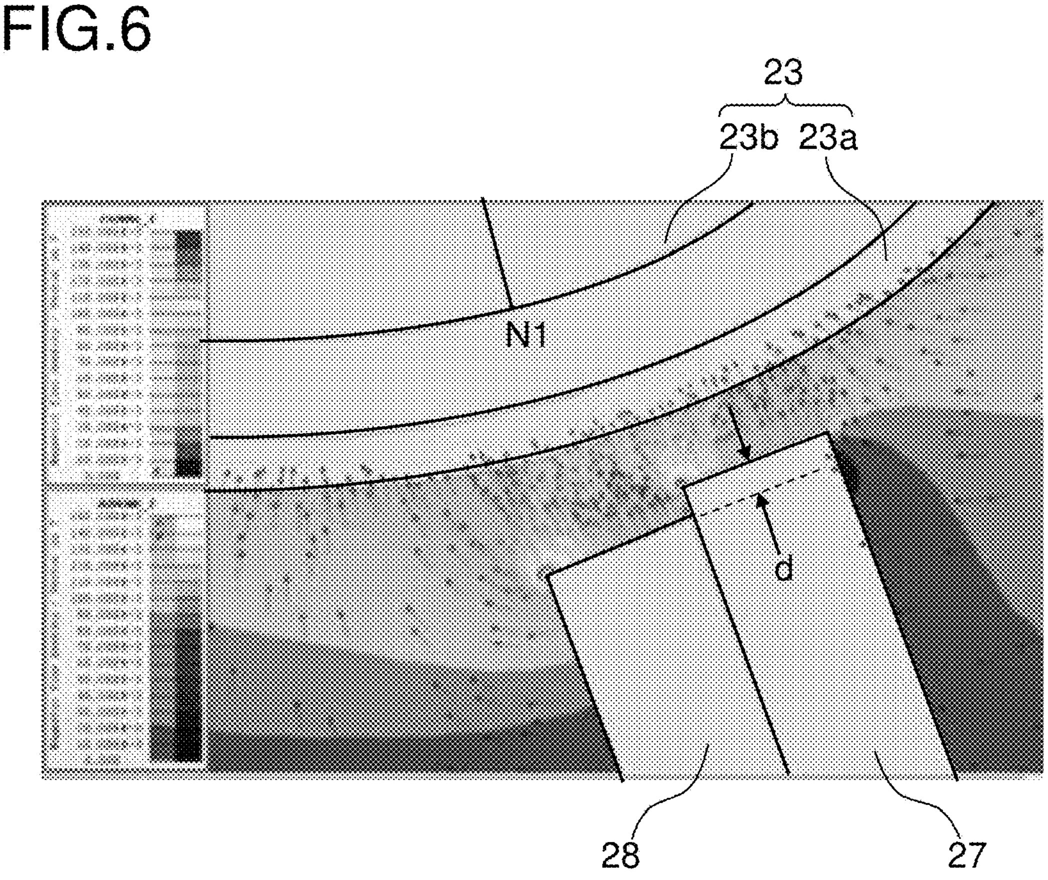
FIG. 6 is a simulation diagram showing a magnetic brush formed at the tip of a regulation blade.

FIG. 6 is a simulation diagram showing the magnetic brush formed at the tip of the regulation blade 27. As shown in FIG. 6, owing to the step d provided between the tip of the regulation blade 27 and the tip of the blade support plate 28, a sufficient magnetic brush is formed between, at one end, the developing roller 23 (the development sleeve 23*a*) and, at the other end, the regulation blade 27 and the blade support plate 28. It is thus possible to carry a stable amount of magnetic brush on the outer circumferential surface of the developing roller 23 and thereby secure stable image quality in the development conditions mentioned above.

The present disclosure is not limited to the above embodiment and allows for various modifications within a scope not departing from the spirit of the disclosure. For example, while the above embodiment deals with a color printer 100 of an intermediate transfer type configured such that a toner image formed on the photosensitive drums 1*a* to 1*d* is primarily transferred to the intermediate transfer belt 8 and is secondarily transferred to the transfer sheet P, this is not meant as any limitation; the present disclosure is also applicable to a color printer of a direct transfer type in which a toner image formed on the photosensitive drums 1*a* to 1*d* is directly transferred to the transfer sheet P.

In the intermediate transfer type, however, if carrier development occurs, the carrier present between the photosensitive drums 1*a* to 1*d* and the intermediate transfer belt 8 causes primary transfer failure and this is liable to affect image quality. The configuration of the embodiment is therefore effective in an image forming apparatus of the intermediate transfer type, and is especially effective in a configuration where, as an intermediate belt 8, a resin belt is used which is prone to primary transfer failure due to carrier development.

While the above embodiment deals with, as an example, the color printer 100 of a tandem type as the image forming apparatus, needless to say, the present disclosure is applicable to any other image forming apparatuses of the two-component development type, such as color copiers, color multifunction peripherals, monochrome printers, and monochrome multifunction peripherals.

The present disclosure finds applications in image forming apparatuses of the two-component development type which use an amorphous silicon photosensitive member as an image carrying member. By applying the present disclosure, it is possible to provide an image forming apparatus that offers satisfactory image quality even with a configuration where carrier development is liable to affect image quality.

What is claimed is:

1. An image forming apparatus comprising:

an image carrying member that has an amorphous silicon photosensitive layer formed on a surface thereof;

a charging device that electrostatically charges the surface of the image carrying member;

an exposure device that exposes the surface of the image carrying member electrostatically charged by the charging device to light to form an electrostatic latent image with reduced electrostatic charge;

a development device including a developer carrying member that carries two-component developer containing toner and carrier, the development device supplying the image carrying member with the toner in the developer carried on the developer carrying member to develop the electrostatic latent image into a toner image; and a development voltage power supply that applies to the developer carrying member a development voltage resulting from superposing an alternating-current voltage Vac on a direct-current voltage Vdc;

wherein when a blank part potential on the image carrying member is V0 [V], a peak-to-peak value of the alternating-current voltage Vac is Vpp [kV], and a gap between the image carrying member and the developer carrying member is Ds [mm], then formulae (1) and (2) below are fulfilled:

$$10 \leq V0 - Vdc \leq 90 \quad (1)$$

$$1.2 \leq Vpp/Ds \leq 3.5. \quad (2)$$

2. The image forming apparatus according to claim 1, wherein formula (3) below is fulfilled:

$$10 \leq V0 - Vdc \leq 60. \quad (3)$$

3. The image forming apparatus according to claim 1, wherein a frequency f [kHz] of the alternating-current voltage Vac fulfills formula (4) below:

$$10 \leq f \leq 15. \quad (4)$$

4. The image forming apparatus according to claim 3, wherein formula (5) below is fulfilled:

$$12 \leq f \leq 15. \quad (5)$$

5. The image forming apparatus according to claim 1, wherein the blank part potential V0 [V] fulfills formula (6) below:

$$100 \leq V0 \leq 250. \quad (6)$$

6. The image forming apparatus according to claim 1, wherein the development device includes:

a regulation blade that is arranged opposite an outer circumferential surface of the developer carrying member and that regulates a layer thickness of a magnetic brush formed on the developer carrying member with the two-component developer; and a blade support plate that is arranged upstream of the regulation blade with respect to a rotation direction of the developer carrying member and to which the regulation blade is fixed, the developer carrying member includes:

a development sleeve that is rotatable; and a magnet that is fixed in the development sleeve so as not to be rotatable and that has a plurality of magnetic poles including a main pole opposite the image carrying member and a regulation pole opposite the regulation blade, and a half-value width of the regulation pole is 50° or more, and the regulation blade is fitted to the blade support plate so as to form a step in a direction approaching the development sleeve.

7. The image forming apparatus according to claim 1, further comprising:

an intermediate transfer belt that is arranged opposite the image carrying member and to which the toner image formed on the image carrying member is primarily transferred.

8. The image forming apparatus according to claim 7, wherein the intermediate transfer belt is a resin belt.

* * * * *